United States Patent [19]
Reichel et al.

[11] Patent Number: 5,581,383
[45] Date of Patent: Dec. 3, 1996

[54] ARRANGEMENT FOR OPTICAL AUTOCORRELATION

[75] Inventors: Frank Reichel; Ernst Gaertner, both of Jena, Germany

[73] Assignee: Jenoptik Technologie GmbH, Jena, Germany

[21] Appl. No.: 395,669

[22] Filed: Feb. 28, 1995

[30]     Foreign Application Priority Data

Mar. 14, 1994 [DE] Germany ..................... 44 08 540.0

[51] Int. Cl.$^6$ .................... C02F 1/135; G01B 9/02; G06E 3/00
[52] U.S. Cl. ................. 349/116; 359/559; 359/561; 356/345; 364/822; 382/278; 382/211; 382/209
[58] Field of Search .................... 359/93, 94, 95, 359/45, 72, 559, 99, 102, 561, 63; 250/550; 382/278, 211, 209; 356/345; 364/822, 819, 827

[56]          References Cited

U.S. PATENT DOCUMENTS

| 4,018,509 | 5/1977 | Boswell et al. .................. 359/72 |
| 4,695,973 | 9/1987 | Yu ................................ 364/822 |
| 5,367,579 | 11/1994 | Javidi et al. ................... 382/31 |

OTHER PUBLICATIONS

"Particle Image Velocimetry Processing using an Optically Addressed Spacial Light Modulator", Sharpe et al, Applied Optics, Dec. 10, 1992 vol. 31 #35 pp. 7399–7402.

*Primary Examiner*—William L. Sikes
*Assistant Examiner*—Kenneth Parker
*Attorney, Agent, or Firm*—McAulay Fisher Nissen Goldberg & Kiel, LLP

[57]          ABSTRACT

An arrangement for optical autocorrelation of laser speckle photography (LSP) photographs or particle image velocimetry (PIV) photographs using optical Fourier transforms is disclosed. The object of providing an electro-optical arrangement for optical correlation of LSP film recordings and PIV film recordings which is simple to produce and accurate is met by using an optically addressable liquid crystal SLM (spatial light modulator) for producing the Young's fringe patterns which contains a uniaxial double-refracting liquid crystal layer and is read out with linearly polarized light of a laser light source, wherein the polarization direction of the laser light source on the readout side coincides with the extraordinary semi-axis of the refractive index ellipsoid of the liquid crystal layer.

7 Claims, 1 Drawing Sheet

ARRANGEMENT FOR OPTICAL AUTOCORRELATION

BACKGROUND OF THE INVENTION

1. Field of the Invention

The invention is directed to an arrangement for optical autocorrelation of laser speckle photography (LSP) photographs or particle image velocimetry (PIV) photographs using optical Fourier transforms.

2. Description of the Related Art

It is known to apply laser speckle photography (LSP) for accurate determination of the deformation state of surfaces. In so doing, the surface to be analyzed is irradiated by an expanded laser beam. The surface illuminated in this way is imaged on film material by means of a camera. As the result of a first exposure pulse, a corresponding speckle pattern is formed on the photographic material. If the surface moves or deforms after the initial exposure, the correspondingly changed laser speckle pattern is recorded on the same film material by a second laser exposure pulse. As a result of this double exposure, a pattern of speckle points is formed on the developed film material. In so doing, the spacing and orientation of two adjacent points indicates the magnitude of the surface change. In order to determine the displacement of the speckles along the film surface in a stepwise manner, the two-dimensional deformation profile or displacement vectors of the surface can be determined. An exact description of the method is given by Sirohi ("Speckle Merology", Marcel Dekker Inc., New York, Basel, Hong Kong (1993)) or Lauterborn ("Coherent Optics: Fundamentals for Physicists and Engineers", Berlin (1993)).

Similar point pictures are formed in the analysis of flow velocities and their two-dimensional distribution. The measuring method known as particle image velocimetry (PIV) is based on the fundamental principle of adding small particles to the flow so that these particles can follow the flow. When the flow to be analyzed is exposed by a laser light section, double exposure produces point pictures on the photographic material. The spacing and orientation of adjacent points characterize the velocity vector at the location in question. Given knowledge of the interval between the exposure pulses of the laser, the absolute velocity can be measured. When this spacing and orientation between the picture points is determined by scanning the film material, a corresponding network of two-dimensional velocity vectors is given. This method is extensively described by Adrian ("Particle-Image Techniques for Experimental Fluid Mechanics", *Annu. Rev. Fluid Mech.*, 23, 261–304 (1991)) and also by Kurada et al. ("Particle-imaging techniques for quantitative flow visualization: a review", *Optics & Laser Technology*, 25, 219–232, (1993)).

For analysis of the above-mentioned photographic images, the point displacements must be determined in a stepwise manner as was described above. With a maximum size of the photographic image of 10×78 $cm^2$, for example, there are 28,000 image fields to analyze on the photographic image given a spacing of approximately 0.5 mm between the operation units. Even with a small image film with a format of 24×36 $mm^2$, there are still 3,456 operation units to be analyzed. Accordingly, the evaluation of the photographic materials is tedious. It has been the object of a number of studies to reduce the evaluation time.

The general approach used to determine the spacing between pairs of particle images is based on calculation of the autocorrelation function. A faster method is achieved by using Fourier transforms. As a result of the first Fourier transform of the particle image and subsequent squaring of the amount, Young's fringes are formed. A further Fourier transform of the Young's fringe pattern yields the autocorrelation function. This function is two-dimensional and ideally comprises three maxima in the amplitude distribution. The coordinates of the orders of diffraction mentioned above yield the direction and magnitude of the mean displacement of particles in the respective operation unit on the film image.

In EP-A-0422 212 (WO90/13036) Farrell describes an optical correlator for analyzing PIV photographs. The Young's fringe pattern is photographed by a CCD camera and written into an electrically addressable spatial light modulator (liquid crystal SLM). The second Fourier transform is then effected optically. The liquid crystal SLM serves as a reversible image storage. It is illuminated by a laser beam so that the autocorrelation function is recorded by a second CCD camera, followed by a search of the coordinates of the orders of diffraction. The disadvantage of this arrangement consists in the high cost of equipment. For example, two camera systems with corresponding electronic control units are required for recording the image and reproducing it on the matrix type spatial light modulator or on a computer for detecting the coordinates of the orders of diffraction. The use of liquid crystal matrix displays formed by commercially available TV's as electrically addressable spatial light modulators compels the use of large-aperture objectives due to the large dimensions of the liquid crystal SLMs (diagonal of several centimeters). Because of their large dimensions, these optical systems are prone to interference and cost-intensive. The use of a Faraday liquid crystal SLM with a pixel resolution of 48×48 described by Kompenhands et al. (Eighth International Congress on Applications of Lasers & Electro-Optics, Oct. 15–20, 1989, Orlando, U.S.A.) results in low accuracy in the evaluation of Young's fringes and accordingly has the disadvantages described above with reference to the digital Fourier transforms with low pixel numbers.

Coupland and Halliwell ("Automated Optical Analysis of Young's Fringes-Optical Autocorrelator", *Opt. & Laser Eng.*, 14, 351–361 (1991) and "Particle imaging velocimetry: rapid transparency analysis using optical correlation, *Appl. Opt.*, 27, 1919–1921, (1988)) describe an automatic optical correlator which uses an optically addressable SLM instead of an electrically addressable SLM. This liquid crystal SLM lies in the image-side focal plane of a first Fourier transform objective so that the Young's fringes are imaged on the SLM. An SLM produced from a BSO (bismuth silicon oxide) crystal changes its optical activity according to the projected exposure intensity. This change in optical activity can be reconstructed with a second laser. The optical autocorrelation is effected by means of a second Fourier transform arrangement so that only one CCD camera is required for peak detection in the autocorrelation plane. The long switching times of the BSO SLM in this arrangement are disadvantageous. For example, the relaxation times for the optical response of the SLM are approximately 0.5 to 1 s, which does not enable a substantial reduction in the evaluation time of the PIV photographs or LSP photographs. Further, activation of the BSO crystal on the write-in side requires a high-performance laser and a voltage supply of the BSO SLM of approximately 2 to 10 kV, which works out unfavorably for practical use.

Sharpe and Johnson ("Particle image velocimetry fringe processing using an optically addressed spatial light modulator", *Appl. Opt.*, 31, 7399–7402 (1992)) describe the use of an optically addressed liquid crystal SLM with a ferroelectric liquid crystal layer (FLC). The utilized liquid crystal SLM is formed by a "photosemiconductor-FLC" sandwich system. The disadvantage of this liquid crystal SLM consists in the modulation of the readout light with two stable molecular positions typical of ferroelectric liquid crystals. This leads to a binarization of the Young's fringes. The second Fourier transform is effected with reduced data contents and consequently results in a less accurate autocorrelation function. The resulting disadvantage is a deterioration of the measuring accuracy of the optical autocorrelation arrangement.

This is also true of the arrangement with a FLC-liquid crystal SLM described by Mao, Halliwell and Coupland in "Particle imaging velocimetry. High-speed transparency scanning and correlation-peak location in optical processing systems" (*Appl. Opt.*, 32, 5089–5091, (1993)).

OBJECT AND SUMMARY OF THE INVENTION

The primary object of the present invention is to provide an accurate electro-optical arrangement for optical correlation of PIV film materials and LSP film materials which is simple to produce.

According to the invention, this object is met in an arrangement for optical auto correlation of film recordings of laser speckle photography or particle image velocimetry with a laser light source comprising a laser light source having light which penetrates a laser speckle photographic or particle image velocimetry recording so that Young's fringe patterns occur in the image-side focal plane of a Fourier transform objective. An optically addressable liquid crystal SLM is included on which the fringe pattern is imaged. A second laser light source reads out the liquid crystal SLM and, by a second Fourier transform objective, produces a diffraction pattern corresponding to the Fourier-transformed Young's fringes. A camera is included for recording the diffraction pattern. The liquid crystal SLM contains a liquid crystal layer of a uniaxial double-refracting crystal and which is read out with linearly polarized light of the second laser light source on the readout side. The polarization direction of the second laser light source coincides with the extraordinary semi-axis of the refractive index ellipsoid of the liquid crystal layer.

The basic idea of the present invention is founded on the consideration that optical realization of autocorrelation is practical for accurate and fast peak detection of particle images such as occur by means of double exposure in laser speckle photography or particle image velocimetry. An arrangement of this kind substantially comprises a reversible image storage which serves to record the Young's fringes and, at the same time, effects a transform of the intensity distribution of the Young's fringes in a two-dimensional change in the optical characteristics of a medium so that a second laser beam can be diffracted at this medium and a further Fourier transform can be realized optically.

A high signal-to-noise ratio in the autocorrelation plane is a prerequisite for achieving high accuracy in peak detection. The signal-to-noise ratio is determined by the intensity of the +/− first orders of diffraction, since these characterize the spacing and orientation of the Young's fringes. There must be a high signal-to-noise ratio for different image patterns with differing and alternating contrast of the particle pairs on the photographic recording. The number of regulating criteria and their time constants must be small in order to ensure short processing times.

According to the invention, this is realized by using an optically addressable liquid crystal SLM. The liquid crystal SLM has a photosensitive semiconductor, a dielectric mirror and a liquid crystal layer. According to the invention, the liquid crystal layer is a uniaxial double-refracting crystal, the readout light is linearly polarized and passes parallel to the axis of the extraordinary refractive index. The diffraction effectiveness for such phase-modulated media is greater than for analog amplitude modulations such as are used for displaying information by means of polarizers, e.g., in LCD's.

The use of a nematic liquid crystal with positive dielectric anisotropy with planar, non-twisted orientation is advantageous. Such liquid crystals are known generally (cf. D. Demus, H. Zaschke, Liquid Crystals in Tables, Vol. 1 (1974), Vol. 2 (1984), Leipzig). Mixtures with high optical anisotropy of the refractive index are preferred.

A liquid crystal SLM which has a determined sensitivity distribution with respect to the write-in light is advantageously used. In so doing, the sensitivity should be lowest at the center of the liquid crystal SLM and should increase outwardly symmetrically with respect to the center. The realization of a sensitivity distribution with a curve inversely proportional to the intensity distribution of an Airy disk, such as occurs as a result of the diffraction of the write-in laser light at only one particle or speckle, is advantageous.

The advantageous sensitivity distribution of the liquid crystal SLM used according to the invention is characterized by a reciprocal Gaussian distribution. The liquid crystal SLM designed in this way brings about a considerable increase in the diffraction effectiveness in the projection of Young's fringes on the liquid crystal SLM. As is well-known, the Young's fringes represent, in the simplest case, the Fourier transform of a pair of trigonometric functions which mirror a radially symmetrical cosinusoidal intensity modulation of an Airy disk.

The use of a liquid crystal SLM with a uniform sensitivity distribution would result in a central portion with a sufficiently high exposure intensity. All portions extending outward are acted upon by a lower exposure intensity so that the liquid crystal in these portions is activated only very slightly, if at all, and consequently contributes only slightly, if at all, to the diffraction of the light on the readout side. As a result, the proportion of undiffracted light in the autocorrelation plane compared with the intensity of the information carrying +/− first orders of diffraction is too great.

The arrangement proposed by the present invention describes a liquid crystal SLM with a radially symmetrical sensitivity distribution. Accordingly, the existing drop in intensity in the modulated Airy disk is compensated for by a corresponding sensitivity distribution. There is a uniform activation of the liquid crystal along the entire active surface of the liquid crystal SLM and a considerable increase in the diffraction effectiveness and a consequent improvement in the signal-to-noise ratio.

In the exposure of the film material produced by double exposure, an uneven density of the film material due to flares or other object-oriented factors must be reckoned with. These variations in contrast must not be allowed to impair the accuracy of peak detection.

According to the invention, this is realized by means of a film-dependent sensitivity control of the liquid crystal image converter. For this purpose, a beam splitter serving to couple out a portion of the evaluated light is introduced in the beam path on the readout side. The central order of diffraction is imaged on a point receiver by a suitable lens. This point receiver serves to measure the intensity of the zero order of diffraction. The operating frequency and/or operating voltage of the liquid crystal SLM is varied by means of a control element in such a way that a minimum intensity of the zero order diffraction is achieved. For this purpose, the control unit is connected with the operating unit of the liquid crystal SLM. The change in the operating frequency of the liquid crystal SLM is advantageous, since no change in the position of the operating point on the phase-intensity characteristic line of the liquid crystal SLM is effected by varying the frequency. As a result, the liquid crystal SLM quickly follows the changed exposure ratios. Accordingly, by regulating the frequency, the sensitivity of the liquid crystal SLM can be adapted quickly to the respective intensity of the Young's fringes given by the film image.

According to the invention, the exposure of the liquid crystal SLM is effected with the Young's fringe patterns and the readout of the liquid crystal SLM for the second Fourier transform is effected with coherent linearly polarized light, wherein the polarization direction of the readout light extends parallel to the extraordinary index of refraction of the liquid crystal, as was mentioned above, and the polarization direction of the write-in light extends vertically to this direction. As a result of a partial transmission of the liquid crystal SLM, this step leads to a suppression of the influence of the write-in light on peak detection. Due to the different polarization of the light sources, the residual light of the write-in light source penetrating the liquid crystal SLM can be blocked by means of a suitable polarization filter arranged in front of the camera unit. This prevents a superposition of the residual write-in light with the intensity distribution of the readout light in the autocorrelation plane. Test results show that this step is an important source of improving the reliability of detection, particularly in the analysis of original film materials, i.e., not specially copied negatives. Accordingly, at the same time, there is no need in many cases to recopy the pictures so that considerable time is saved and the analysis of PIV photographs and LSP photographs is simplified.

According to the invention, laser light sources of different wavelengths can be used to suppress the influence of the aforementioned residual light in the autocorrelation plane brought about by a residual transmission of the liquid crystal SLM. For this purpose, an optical filter is introduced in the readout beam path for suppression of the residual light from the write-in light source. This optical filter allows the readout light to pass, but not the write-in light.

With the arrangement according to the invention it is possible to evaluate the film records of LSP or PIV patterns in a more accurate manner than before in that the signal-to-noise ratio in processing the Young's fringe patterns is distinctly improved. This is effected without impairing processing speed.

The invention is explained more fully in the following with reference to embodiment examples for optical autocorrelation of LSP photographs and/or PIV photographs.

DESCRIPTION OF THE PREFERRED EMBODIMENTS

EXAMPLE 1

Figure 1:
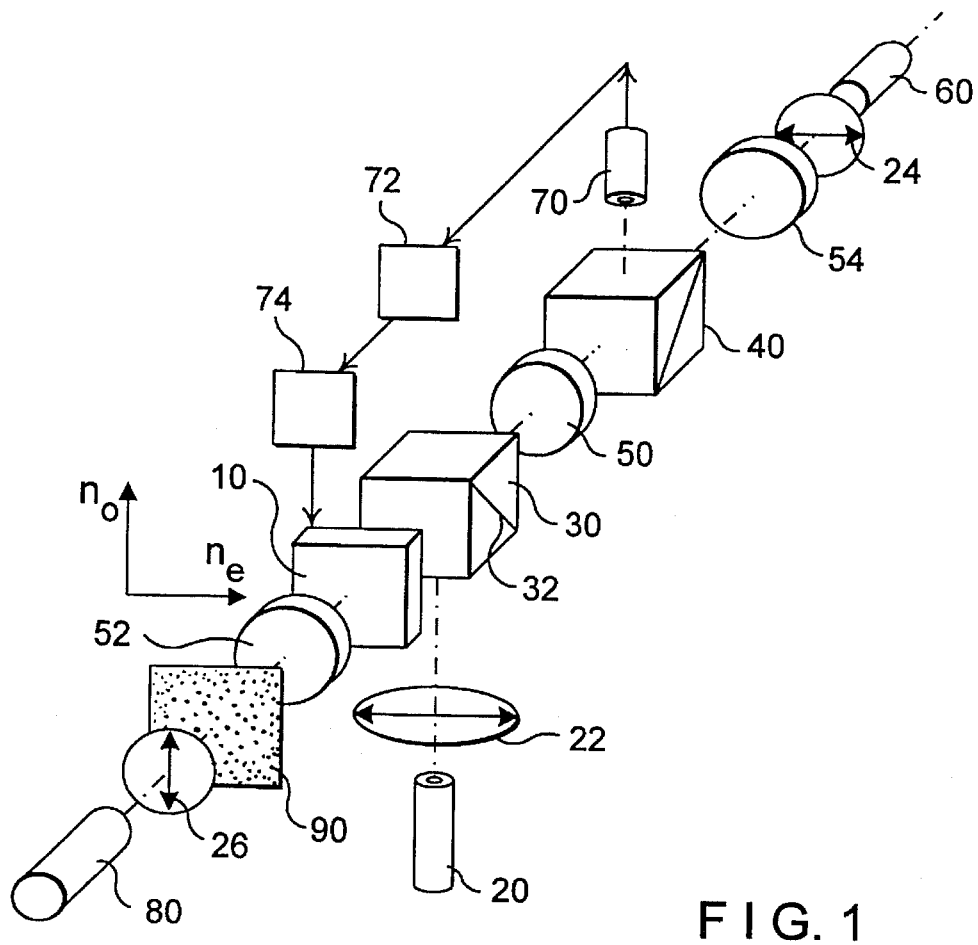
FIG. 1 shows a basic diagram of an optical autocorrelator.

FIG. 1 shows an electro-optical arrangement for optical autocorrelation of particle images. This arrangement has a liquid crystal SLM 10 whose cross section is shown in more detail in FIG. 2 and whose sensitivity distribution is shown in more detail in FIG. 3. The liquid crystal layer 14 is aligned, e.g., by the friction of two orientation layers 18 at the boundary surfaces. Polyimide films are preferably used. These polyimide films are applied to the substrate by centrifuging from solvents and are then tempered at approximately 200° C. The polyimide PI 2734 sold by Du Pont is mentioned by way of example. When the friction is effected parallel to the opposite boundary surfaces, a liquid-crystalline layer which can be described as a uniaxial double-refracting crystal is produced after filling a corresponding gap with a liquid crystal with a dielectric anisotropy of greater than 0 Nematic liquid crystals with a large anisotropy (refractive index difference $\Delta n$) are preferably used, e.g., the TN403 mixtures by Hoffmann-La Roche with $\Delta n=0.258$ or the TN8467 mixture with $\Delta n=0.2078$. The direction of the extraordinary refractive index $n_e$ is defined in an unambiguous manner by the direction of friction. As is well-known, the extraordinary refractive index $n_e$ is dependent on voltage so that a controlled phase modulation of the readout light is possible. If the polarization direction of the light is parallel to the extraordinary refractive index $n_e$, maximum attainable phase swings of 6 to 8 $\pi$ result for the aforementioned mixtures at typical thicknesses of the liquid crystal layer 14 of approximately 8 μm and, e.g., a wavelength of 550 nm. As is known, only a phase jump of approximately 1 to 2 $\pi$ is needed to achieve high diffraction effectiveness at phase structures so that the operating point in the phase modulation with the aid of a liquid crystal can be situated in the rear region of the refractive index-voltage characteristic line. This leads to short switching times of the liquid crystal and is a prerequisite for high processing rates. Typically, the described liquid crystal SLM 10 is operated at an operating voltage of 3 to 6 V and operating frequencies of approximately 70 to 200 Hz resulting in an effective bias of approximately 2 to 3 V applied to the liquid crystal layer 14. Accordingly, the liquid crystal molecules are in a tilted position and can follow rapidly occurring voltage changes resulting from changes in the intensity of the Young's fringes. The image reproduction rate in a procedure of this type is approximately 25 to 50 images/second. With exposure at a write-in intensity of approximately 20 to 40 μW/cm², the voltage division changes in such a way that a phase modulation of approximately 1 to 2 $\pi$ is achieved.

In a sandwich structure composed of a photosemiconductor and liquid crystal, it is possible to change the refractive index as a function of voltage by means of exposing the photosemiconductor. In addition to a large difference between the extraordinary $n_e$ and ordinary refractive index $n_o$, the impedance matching of liquid crystal and photosemiconductor plays a decisive role for the exposure-dependent activation of the liquid crystal. The use of high-impedance photoconductors such as amorphous silicon is advantageous. These layers are deposited by means of a plasma CVD process from silane compounds. Advantageous parameters of the layers result with respect to their impedance matching with a silane partial pressure of approximately 20 Pa, a plasma-producing high-frequency voltage of approximately 380 V and a dc voltage of approximately 170 V. The substrate temperature is approximately 250° C.

Figure 2:
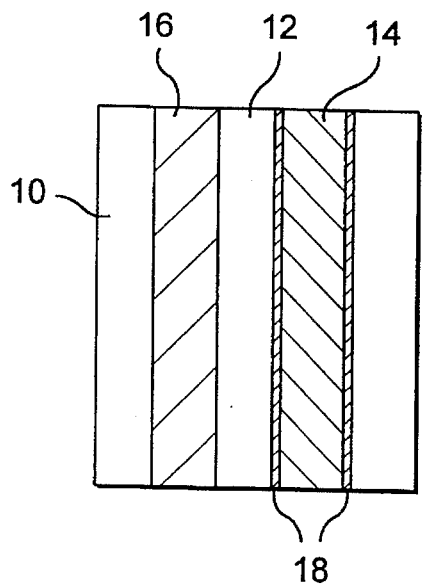
FIG. 2 shows a cross section of a liquid crystal SLM.

Consequently, in a sandwich structure of photosemiconductor and liquid crystal—as is shown in its entirety in FIG. 2 for the application according to the invention —exposure of the photosemiconductor results in a change in the refractive index as a function of voltage. With its special construction, the liquid crystal SLM 10 according to the invention takes into account the circumstances, known per se, in that it is optically addressed (written in) on the one hand (left side of FIG. 2) and optically read out on the other hand (right side of FIG. 2). A dielectric mirror 12 is accordingly arranged between the above-mentioned liquid crystal layer 14 (embedded in orientation layers 18) and the photosensitive layer 16 and substantially separates the write-in light and readout light from the laser light sources 20 and 80 and extensively limits their reciprocal influence.

Figure 3:
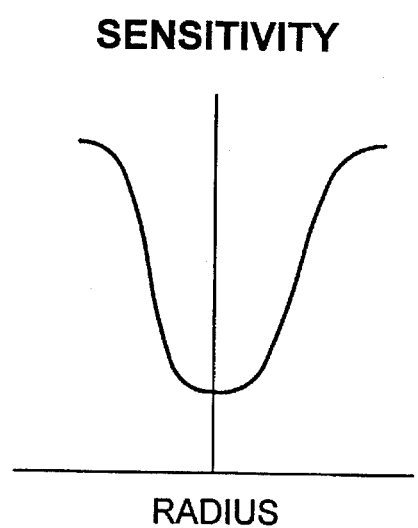
FIG. 3 shows a sensitivity distribution of a liquid crystal SLM for the Fourier transform of Young's fringes with a high signal-to-noise ratio.

An advantageous sensitivity distribution according to FIG. 3 is produced in a relatively simple manner in a liquid crystal SLM 10 which contains, as photosensitive layer 16, a hydrogenated amorphous silicon layer produced under the conditions mentioned above. If this layer is irradiated at a corresponding intensity distribution over a sufficiently long period of time, the impedance of the amorphous-Si:H layer changes locally depending on the irradiation intensity. These changes in the amorphous-Si:H layer are irreversible. If the irradiation intensity is comparable to the curve of the intensity distribution of an Airy disk, an analogous change in impedance is effected in the amorphous-Si:H layer resulting in a corresponding variation of the sensitivity of the liquid crystal SLM 10 on the write-in side. This formation of the sensitivity distribution can be effected external to the arrangement in question by means of a suitable irradiation system. Installation in the present arrangement would require a corresponding adjustment of the liquid crystal SLM 10 with respect to the Young's fringes, which can be realized by means of suitable adjusting elements.

The rotationally symmetric sensitivity distribution can be produced most accurately directly within the arrangement described in FIG. 1. For this purpose, the amorphous-Si:H layer is directly irradiated by the light beam of the laser 80 used for writing in the image information. When using a He-Ne laser with a wavelength of 633 nm, an output of 5 mW and a beam cross section of approximately 0.8 mm, an irradiating period of approximately 2.5 hours is required for producing the stable sensitivity profile. The irradiation results in a change in the impedance in the amorphous-Si:H layer roughly corresponding to a reciprocal (with reference to FIG. 3) Gaussian distribution.

If the photographic image with corresponding particle images is now introduced into the write-in beam path mentioned above, the liquid crystal is activated. In so doing, the intensity distribution of the Young's fringes is superimposed on the reciprocal Gaussian distribution of the sensitivity of the liquid crystal SLM 10. As a result, the liquid crystal layer 14 is activated along the entire region of the readout operation unit. Accordingly, a high diffraction effectiveness and consequently a high signal-to-noise ratio is achieved. A further decisive advantage is the possibility afforded by the aforementioned sensitivity distribution to use large operation units so that the number of fringes in the Young's fringe pattern which are subjected to the second Fourier transform increases and accordingly leads to an improved accuracy of peak detection. When the sensitivity distribution is formed directly within the optical arrangement, no subsequent adjustment of the liquid crystal SLM 10 is required with respect to the write-in laser light source 80. This simplifies technical outfitting with sensitive adjustment elements.

The arrangement according to FIG. 1 includes a readout laser light source 20 and a polarizer 22 oriented in such a way that the polarization direction lies in the splitter plane 32 of the beam splitter 30 and coincides with the direction of the extraordinary refractive index 18 of the liquid crystal SLM 10. This orientation is achieved by means of corresponding alignment of the liquid crystal SLM 10 with respect to the polarization direction of the polarizer 22. The optical Fourier transform of the Young's fringes is produced by means of a Fourier transform objective 50. A two-dimensional sensor, e.g., a CCD array camera 60, is arranged in the autocorrelation plane. This sensor serves to record the intensity distribution in the autocorrelation plane. In FIG. 1, a conjugate plane with reference to the autocorrelation plane is conveyed to the CCD array camera 60 by means of additional imaging optics 54 to enable uncomplicated focussing. An additional polarization filter 24 which is aligned parallel to the polarizer 22 is located immediately in front of the CCD array camera 60. A portion of the readout light on a point detector 70 is blocked out by means of a second beam splitter cube 40 so that the intensity of the undiffracted light can be measured. A control signal is determined by means of a measuring unit 72 and conveyed to the operating unit 74 of the liquid crystal SLM 10. In so doing, the operating frequency and operating voltage is set in such a way that the intensity of the undiffracted light is minimized. In the described arrangement, a write-in laser light source 80 is also used for producing the Young's fringes of a film image 90 by means of a second Fourier transform objective 52. A separation of the write-in and readout beam paths is achieved by means of a polarizer 26 which is aligned vertically to the polarization filter 24.

EXAMPLE 2

In a further embodiment form of the electro-optical arrangement, the laser light sources 20 and 80 have different wavelengths so that the residual light coming from the write-in laser light source 80 and penetrating the liquid crystal SLM 10 is blocked by a suitable optical filter in front of the CCD array camera 60. The optical filter (not shown in FIG. 1) is preferably designed as an interference filter.

EXAMPLE 3

A radially symmetrical sensitivity distribution of the liquid crystal SLM 10 is realized by introducing a corresponding graduated filter (also not shown in FIG. 1) in the write-in beam path. In so doing, the photosensitive layer 16 is advantageously coated directly with a graduated filter which absorbs the write-in light and whose transmission gradient is inversely proportional to the intensity distribution of an Airy disk.

While the foregoing description and drawings represent the preferred embodiments of the present invention, it will be obvious to those skilled in the art that various changes and modifications may be made therein without departing from the true spirit and scope of the present invention.

What is claimed is:

1. An arrangement for optical autocorrelation of film recordings of laser speckle photography or particle image velocimetry with a laser light source comprising:

a laser light source having light which penetrates a laser speckle photographic or particle image velocimetry recording so that Young's fringe patterns occur in the image-side focal plane of a Fourier transform objective;

an optically addressable liquid crystal SLM on which the fringe pattern is imaged;

a second laser light source which reads out the liquid crystal SLM and, by a second Fourier transform objective, produces a diffraction pattern corresponding to the Fourier-transformed Young's fringes;

a camera for recording the diffraction pattern;

said liquid crystal SLM containing a uniaxial double-refracting liquid crystal layer which is read out with linearly polarized light of the second laser light source on the readout side; and wherein the polarization direction of said second laser light source coincides with the extraordinary semi-axis of the refractive index ellipsoid of said liquid crystal layer.

2. The arrangement according to claim 1, wherein the liquid crystal layer of the liquid crystal SLM contains nematic liquid crystals with positive dielectric anisotropy.

3. The arrangement according to claim 1, wherein the liquid crystals are non-twisted.

4. The arrangement according to claim 1, wherein the sensitivity distribution of the liquid crystal SLM is radially symmetric and its curve is inversely proportional to the intensity distribution of an Airy disk.

5. The arrangement according to claim 1, wherein a point receiver is arranged in the zero order of a diffraction pattern, whose output signal regulates the frequency of the SLM operating voltage by means of an operating unit in such a way that the intensity of the undiffracted light of the zero order reaches a minimum.

6. The arrangement according to claim 1, wherein the polarization directions of the write-in light and readout light of the liquid crystal SLM extend at right angles to one another and a polarization filter is arranged in front of the camera in the autocorrelation plane for blocking the residual write-in light.

7. The arrangement according to claim 1, wherein the wavelengths of the laser light sources are different so that the residual write-in light can be blocked by an optical filter in front of the camera in the autocorrelation plane.

* * * * *